United States Patent
Gen et al.

[11] Patent Number: 4,671,913
[45] Date of Patent: Jun. 9, 1987

[54] PROCESS FOR PRODUCING AN EMBOSSED THERMOPLASTIC RESIN SHEET HAVING A COLORED LAYER

[75] Inventors: Endo Gen, Moriyama; Tatsu Saneharu, Shiga; Hirokazu Hori, Yasu; Yoshihiro Kawata, Hino, all of Japan

[73] Assignee: Sekisui Kagaku Kogyo Kabushiki Kaisha, Osaka, Japan

[21] Appl. No.: 771,129

[22] Filed: Aug. 30, 1985

[30] Foreign Application Priority Data

Aug. 31, 1984 [JP] Japan .................. 59-183094

[51] Int. Cl.$^4$ .................................. B29C 59/04
[52] U.S. Cl. ................... 264/171; 264/40.2; 264/40.6; 264/237; 264/284; 425/131.1; 425/133.5
[58] Field of Search ............... 264/171, 280, 284, 327, 264/75, 237, 40.6, 40.2; 425/131.1, 133.5, 462

[56] References Cited

U.S. PATENT DOCUMENTS

| | | | |
|---|---|---|---|
| 2,791,801 | 5/1957 | Szantay | 264/327 |
| 3,282,722 | 11/1966 | Hailstone | 264/80 |
| 3,309,452 | 3/1967 | Yumoto et al. | 264/284 |
| 3,354,025 | 11/1967 | Aykanian et al. | 264/245 |
| 3,769,380 | 10/1973 | Wiley | 264/40.6 |
| 3,799,718 | 3/1974 | Kiyona et al. | 425/131.1 |
| 4,256,687 | 3/1981 | Yazaki et al. | 264/280 |
| 4,316,868 | 2/1982 | Esposito et al. | 264/171 |
| 4,332,543 | 6/1982 | Fulton et al. | 264/40.6 |
| 4,562,023 | 12/1985 | Pabst et al. | 425/131.1 |

FOREIGN PATENT DOCUMENTS

| | | | |
|---|---|---|---|
| 757548 | 4/1967 | Canada | 264/284 |
| 53-16086 | 2/1978 | Japan | 264/280 |
| 56-28812 | 3/1981 | Japan | 264/284 |

Primary Examiner—Jeffery Thurlow
Attorney, Agent, or Firm—Wenderoth, Lind & Ponack

[57] ABSTRACT

A process for continuously producing an embossed thermoplastic resin sheet having a colored layer which comprises associating a molten thermoplastic resin A and a molten thermoplastic resin B having a different color from the resin A within a die for extrusion molding, extruding the associated mass through an extrusion opening to form a two-layered thermoplastic resin sheet, and thereafter embossing the sheet, wherein the temperature T (°C.) of the thermoplastic resin sheet immediately before the embossing and the surface roughness R (micrometers) of said sheet immediately before the embossing expressed by a 10-point average roughness in accordance with ISO-R468 are selected so as to satisfy the following relation $1.2R + T \leq 145$ (1).

5 Claims, 4 Drawing Figures

PROCESS FOR PRODUCING AN EMBOSSED THERMOPLASTIC RESIN SHEET HAVING A COLORED LAYER

This invention relates to a process for producing a colored and embossed two-layered thermoplastic resin sheet having a colored layer on one surface. The thermoplastic resin sheet is useful particularly as interlayer of a laminated glass.

Laminated glasses heretofore used in windowpanes of traffic facilities such as motor vehicles and aircraft, and buildings are composed of two glass sheets and an interlayer of a plasticized polyvinyl butyral resin interposed therebetween so as to secure high strength and avoid scattering of glass fragments in the event of breakage. Generally, minute raised and depressed portions are formed by embossing on such interlayers in order to prevent blocking during storage and secure degassing property during the production of laminated glasses. Embossing is usually carried out immediately after extrusion molding of a resin sheet.

On the other hand, to restrict the transmission of light through the laminated glass and to obtain a glare reducing effect, a colored layer, for example a layer colored blue green, is very frequently formed on one surface of the interlayer. In the case of an interlayer used for automobile laminated glasses, such a colored layer is formed not entirely, but in a tape-like shape along one long side of a nearly rectangular interlayer film.

Such a colored layer is formed, for example, by a method described in Japanese Patent Publication No. 45793/1974 in whicn a molten non-colored thermoplastic resin and a molten colored thermoplastic resin are associated in a die for extrusion molding, and extruded from an extrusion opening. For the purpose mentioned above, it is the general practice to emboss the surface of the resulting interlayer to form minute raised and depressed portions on the surface.

The embossed two-layered interlayer film having a colored layer obtained by the above method frequently has color non-uniformity because of providing the colored layer. Hence, a laminated glass produced by using the interlayer film. Hence, a laminated glass produced by using such an interlayer film has a markedly impaired merchandize value in regard to appearance and antiglare effect. It is known to age the interlayer at high temperatures in order to remove the color non-uniformity, but a relatively long perrod of time is required for the aging, and an extra energy is required to economic disadvantage.

It is an object of this invention to provide a process for producing a thermoplastic resin sheet having a colored layer, which can omit the aging step because there is very little or no occurrence of color non-uniformity.

Based on the finding that the development of color non-uniformity is attributed to the roughening of the surface of a thermoplastic resin sheet having a colored layer and to the disturbance of the interface between two thermoplastic resin layers having different colors, the present inventors have succeeded in solving the above problem by selecting the surface roughness of the thermoplastic sheet and the temperature during embossing within a specific range.

Thus, according to this invention, there is provided a process for continuously producing an embossed thermoplastic resin sheet having a colored layer which comprises associating a molten thermoplastic resin A and a molten thermoplastic resin B having a different color from the resin A within a die for extrusion molding, extruding the associated mass through an extrusion opening to form a two-layered thermoplastic resin sheet, and thereafter embossing the sheet, wherein the temperature T (° C.) of the thermoplastic resin sheet immediately before the embossing and the surface roughness R (micrometers) of said sheet immediately before the embossing expressed by a 10-point average roughness in accordance with ISO-R467 are selected so as to satisfy the following relation $1.2R + T \leq 145$ (1).

Examples of suitable theremoplastic resins used as the thermoplastic resins A and B include polyethylene, polypropylene, polystyrene, polycarbonate, vinyl chloride resins, nylon resins, polyvinyl acetal, acrylic resins, polyacetal resin and polyester resins. The resin A and the resin B are preferably of the same kind. The resins A and B, however, may be of different kinds if the two resins have similar flow characteristics such that when they are associated within a die for extrusion molding of sheets, the associated mass forms a laminar flow. A plasticizer, a filler, etc. may be incorporated in the thermoplastic resins A and B. Usually, a dye is included in the resin B. When the resulting sheet is to be used as an interlayer of a laminate glass, a plasticized polyvinyl acetal resin, paricularly a polyvinyl butyral resin containing about 20 to 60% by weight of a plasticizer, is conveniently used as the resins A and B.

Conventional plasticizers may be used for this purpose, and examples include polyhydric alcohol esters such as triethylene glycol di-2-ethyl butyrate, aliphatic polybasic acid esters such as adipates (e.g., dihexyl adipate) and sebacates (e.g., dibutyl sebacate), and aromatic polybasic acid esters typified by phthalates such as dioctyl phthalate.

Polyvinyl butyral preferably has a degree of butyralization of 55 to 80 mole % and a degree of polymerization of 500 to 3,000.

In the process of this invention, the molten resins A and B are associated within a die for extrusion molding, and the associated mass is extruded through an extrusion opening to obtain a two-layered sheet having a colored layer of the resin B. It is not always necessary to provide the colored layer on all over the surface of the sheet. For example, for use as an interlayer of a laminated glass, the colored layer is formed in a tape-like shape having a width of about ¼ of the length of the short side of the sheet, which is nearly rectangular, along one entire long side of the sheet.

The two-layered sheet immediately after extrusion from the extrusion opening is usually fed between a pair of cooled rolls to be cooled and molded into a sheet having a suitable thickness, and thereafter continuously subjected to embossing. If required, the sheet may be immersed in a water tank during the embossing step in order to cool it.

According to this invention, the temperature and surface roughness of the resin sheet immediately before it is subjected to embossing are selected so as to satisfy the expression (1). The surface roughness R is expressed in micrometers by a 10-point average roughness in accordance with ISO-R468 of International Organization for Standardization. The 10-point average roughness in accordance with ISO-R468 is determined as follows:

First, with regard to a standard length L of a sample, surface unevenness is measured by a suitable method (such as a contact needle method) to obtain a sectional curve as shown in FIG. 4. The standard length L is set at a specific length by ISO-R468 according to the degree of surface unevenness. In the present invention, the standard length is set at 8 mm. Within the range of the standard length L, the difference between the average value of the heights of five hills from the highest hill to the 5th highest hill and the average of the depths of five valleys from the deepest valley to the 5th deepest valley is defined as the 10-point average roughness Hz. In FIG. 4, the heights of hills or valleys measured from a properly set reference line X is Hi (i is an integer of 1 to 10), Hz is calculated in accordance with the following equation.

$$Hz = \frac{(H_1 + H_3 + H_5 + H_7 + H_9) - (H_2 + H_4 + H_6 + H_8 + H_{10})}{5} \quad (2)$$

The surface unevenness of the resin sheet immediately before it is subjected to embossing can be measured, for example, by a needle contacting method with respect to a test piece sampled from this sheet and then cooled, and based on the result, the 10-point average roughness Hz can be determined.

The temperature (° C.) of the resin sheet immediately before embossing can be measured during the production by, for example, a radiation thermometer.

The surface roughness of the sheet during embossing is preferably as low as possible because if it is too large, color non-uniformity tends to occur. A sheet having a low surface roughness can be obtained, for example, by maintaining the rotating speed of the extrusion screw relatively low and decreasing the amount of extrusion. In actual operation, a certain level of the amount of extrusion should be ensured for industrial production. Accordingly, the sheet to be embossed generally has a surface roughness, measured by the 10-point average roughness, of 3 to 30 micrometers.

If the temperature of the resin sheet having the colored layer which is to be embossed is too low, fine raised and depressed portions cannot be sufficiently formed. If it is too high, the interface between the thermoplastic resin A and the thermoplastic resin B having a different color tends to be disturbed and develop color-nonuniformity. Accordingly, the temperature of the resin sheet to be embossed is usually 90° to 150° C., preferably 100° to 140° C.

Preferably, the surface roughness R (micrometers) and temperature T (° C.) satisfy the above expression (1) and are individually within the aforesaid ranges.

It is usual practice to extrusion-mold a resin sheet so that the surface roughness of its upper surface becomes nearly equal to that of its under surface, and it is sufficient to measure the surface roughness of only one surface. If, for some purpose, a resin sheet having different surface roughnesses between its upper and under surfaces is to be molded, the larger of the 10-point average roughnesses of the upper and under surfaces should be used as R in expression (1).

A pair of emboss rolls are preferably used to emboss the thermoplastic resin sheet continuously. Calender rolls and die rolls may also be used.

According to this invention, an embossed thermoplastic resin sheet having a colored layer free from color non-uniformity can be obtained by embossing the extrusion-molded resin sheet having a colored layer under conditions which satisfy the expression (1). No clear reason has yet been assigned to this result. The present inventors have found that the development of color nonuniformity is attributed to the roughening of the surface of the thermoplastic resin sheet having a colored layer and to the disturbance of the interface between the thermoplastic resin A and the thermoplastic resin B having a different color. It is presumed that color non-uniformity occurs not only when the roughening of the sheet surface and the disturbance of the interface are remarkable, but also when the two are superimposed and reach a certain level.

On the other hand, the surface roughness R is considered to be a measure of the degree of roughening of the sheet surface, and the sheet temperature T at the time of embossing is considered to be a measure of the degree of the disturbance of the interface mentioned above.

Based on a number of experiments, the present inventors have found that by limiting the value of 1.2R+T to 145 or less, color non-uniformity presumably attributed to the roughening of the sheet surface and the disturbance of the interface is drastically reduced.

The process of this invention will now be described in detail with reference to one example of an apparatus preferably used in practicing the process of this invention.

Figure 1:
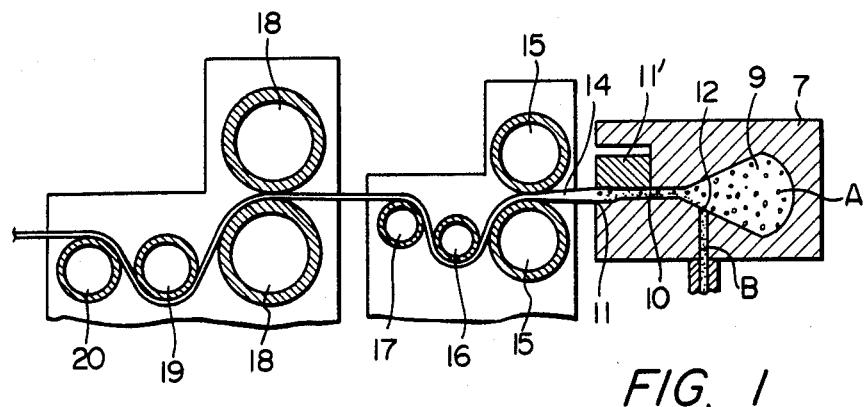
FIG. 1 is a longitudinal sectional view showing one example of an exrusion molding die and an embossing device used in the practice of the process of his invention.
Figure 2:
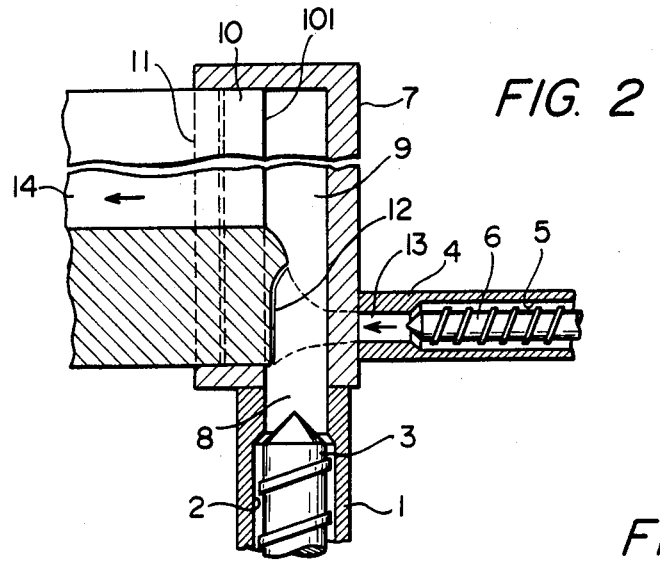
FIG. 2 is a cross sectional view showing a part of the molding die and the extrusion device shown in FIG. 1.

With reference to FIGS. 1 and 2, the reference numeral 1 represents an extrusion device for kneading and melting a thermoplastic resin A. The non-colored thermoplastic resin A fed from a hopper (not shown) is heated within a cylinder 2 and kneaded by a screw 3, and melted. A feed device 4 is provided for feeding a colored thermoplastic resin B. The colored resin B fed into a cylinder 5 is kneaded and melted by the driving of a screw 6 in the feeding device 4. The reference numeral 7 is a die for extrusion molding, and a resin flow inlet 8 connected to the extrusion opening of the extrusion device 1 and an enlarged flow passage 9 are formed in the die 7. The enlarged flow passage 9 communicates with a land 10 which is narrower than the passage 9. An extrusion opening 11 is formed at the forward end of the land 10. The clearance of the extrusion opening 11 is microadjustable by a vertically movable lip die 11'. The reference numeral 101 is a boundary line between the enlarged flow passage 9 and the land 10.

An opening portion 12 opened into the enlarged flow passage 9 is connected to the feeding device 4 for the colored resin B through a feed passage 13 for the resin B. The colored resin B melted in the feed device 4 passes through the feed passage 13 and reaches the opening portion 12 from where it is extruded into the enlarged flow passage 9. Thereafter, it is associated with the flow of the non-colored thermoplastic resin A which is spreading in a direction at right angles to the sheet extrusion direction. The associated mass flows while spreading widthwise within the enlarged flow passage 9, and reaches the land 10. While being moled into a sheet form, it passes through the land 10, and extruded in sheet form from the extrusion opening 11.

The reference numeral 14 represents a thermoplastic resin sheet having a width of 0.5 to 2.5 m and a thickness of about 1 to 7 mm immediately after being extruded from the extrusion opening 11 of the die 7. The hatched portion in FIG. 2 shows a portion colored with the colored thermoplastic resin B associated in the opening portion 12.

FIG. 1 more clearly shows the relative positions of the opening portion 12 opened into the ennlarged flow passage 9, the enlarged flow passage 9, the land 10, and the extrusion opening 11 which is narrower than the enlarged flow passage 9.

In FIG. 1, the reference numerals 15 represent cold press rolls in which cold to warm water at a temperature of about 20° to 50° C. is circulating. Raised and depressed portion having a roughness of 10 to 40 micrometers are formed on their surfaces, and a mold releasing agent is coated on them. These rolls send the sheet 14 to guide rolls 16 and 17 accurately in a stable condition. Cold or warm water is circulated also in the guide rolls 16 and 17. By controlling the temperature of the circulating water in the press rolls 15 and the guide rolls 16 and 17, the temperature T of the sheet immediately before being fed to emboss rolls 18 can be controlled.

The emboss rolls 18 have an arithmetic average surface hardness of 10 to 60 micrometers as a result of shot blasting and are coated with a mold releasing agent. Steam at a temperature of about 100° to 150° C. are circulated within the embossing rolls 18. The rotating speed of the rolls 18 can be adjusted independently of the cold roll. Instead of the pair of emboss rolls 18, two pairs of rolls one of which is a smooth roll may be used to emboss each side of the sheet 14.

Guide rolls 19 and 20 having cold or warm water circulating therein are also provided.

The process for producing an embossed thermoplastic resin sheet having a colored layer using the apparatus shown in FIGS. 1 and 2 will be described below. From the resin flow inlet 8 of the die 7, the molten thermoplastic resin A is forced into the die 7 by the extrusion device 1, passed through the enlarged flow passage 9 and the land 10 of the die 7, and extruded in sheet form from the extrusion opening. In the meantime, the molten thermoplastic resin B is fed from the feed device 4, passed through the resin feed passage 13, and extruded from the opening portion 12 of the enlarged flow passage 9. Thus, the resin B is associated with the thermoplastic resin A which is spreading widthwise within the enlarged flow passage. The associated mass is caused to flow within the enlarged flow passage in this state, passed through the land 10, and extruded in sheet form from the extrusion opening 11.

The two-layered thermoplastic resin sheet 14 having a colored laeyr thus extruded are cooled by the cold press rolls 15, and fed through the guide rolls 16 and 17 to the embossing rolls 18 where it is embossed under such conditions that the surface roughness (micrometers) and temperature (° C.) of the sheet immediately before embossing satisfy the expression (1) given hereinabove.

The temperature of the sheet immediately before being fed to the embossing rolls 18 can be measured, for example, by using a radiation thermometer. Its surface roughness can be measured, for example, by using a contact needle method with respect to a test piece sampled from the sheet immediately before embossing and then cooled.

The surface roughness of the resin sheet is determined by the amount of the resin extruded, the resin temperature and clearance at the die extrusion opening 11, and the surface roughnesses of the press rolls 15 and the guide rolls 16 and 17. On the other hand, the temperature of the resin sheet is determined by the amount of the resin extruded, the resin temperature at the die extrusion opening 11, and the surface temperatures of the press rolls 15, and the guide rolls 16 and 17.

Accordingly, the surface roughness and temperature of the sheet can be controlled by controlling these factors. In particular, the temperature of the resin sheet can be controlled as desired during the sheet formation by controlling the temperatures and amounts of the water circulating through the press rolls and guide rolls.

Figure 3:
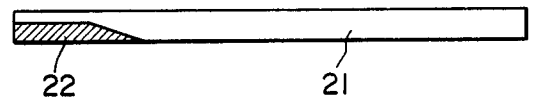
FIG. 3 is a sectional view in the width direction of a resin sheet produced in accordance with the process of this invention.
Figure 4:
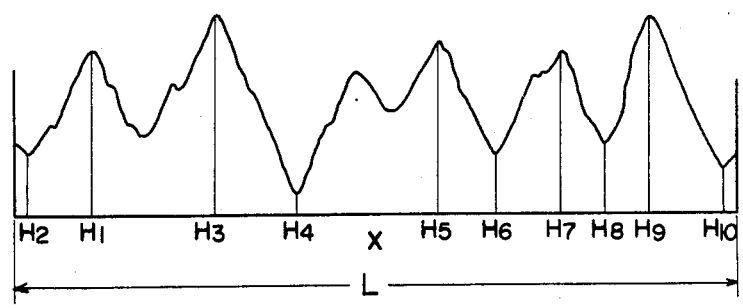
FIG. 4 is a sectional view of a sheet surface for illustrating the 10-point average surface roughness.

FIG. 3 is a sectional view in a widthwise direction of one example of an embossed thermoplastic resin sheet having a colored layer produced by the process of this invention. The reference numeral 21 represents a non-colored portion; and 22, a colored portion. On both surfaces of the sheet, minute raised and depressed parts of the desired depth are formed (not shown), but no color non-uniformity occurs.

As shown in the drawing, the colored layer 22 has a constant thickness from one side end portion of the sheet to an inside point way from the side end portion by a predetermined distance, but further inwardly, the thickness changes continuously. Hence, the color density is uniform from be side end portion to the inward point at a predetermined distance, but becomes gradually lower further inwardly. The resin sheet which is colored so that the color density contiuously changes is especially useful as an interlayer of automobile laminated glasses.

EXAMPLES 1–7

By using the apparatus shown in FIGS. 1 and 2, an embossed polyvinylbutyral resin sheet having a colored plasticized polyvinylbutyral resin layer was produced.

A composition composed of 100 parts by weight of polyvinyl butyral and 40 parts of triethylene glycol di-2-ethylbutyrate was fed into the extrusion device 1. A composition of the same components as above but further comprising 0.1 part of a dye was fed into the feed device 4. In accordance with the procedure specifically described hereinabove, a polyvinyl butyral resin sheet having a blue green layer with a continuously changing degree of coloration was formed. It was embossed by using embossing rolls 18.

The 10-point average surface roughness R (micrometers), the temperature T (°C.) and the 1.2R+T value of the sheets in each run are shown in Table 1.

The 10-point average surface roughness was measured by using a contact needle-type surface roughness tester (SURFCOM 1210A supplied by Tokyo Seimitsu K. K.), and the temperature T was measured by an irradiation-type thermometer utilizing infrared radiation.

The widths of the resulting sheets were 100 to 200 cm (the widths of the colored layers 20 to 40 cm).

The color non-uniformity of each of the resulting resin sheets was evaluated as follows:

A laminated glass was produced by using the resin sheet as an interlayer. Blue sheets (made by Mitsubishi Rayon Co., Ltd.; Acrylite, cobalt blue #302, thickness 0.5 mm) were stacked on the glass one by one until the color non-uniformity of the resin sheet could not be perceived with the naked eye. The number of the blue sheets so stacked was defined as a color non-uniformity rank. The smaller the value, less the color non-uniformity. When the color non-uniformity rank is 4 or below, the sheet does not require aging.

The results are also shown in Table 1.

It is seen from Table 1 that in any of these examples, the resulting sheets had only slight color non-uniformity and did not require aging.

TABLE 1

| Example | R (μm) | T (°C.) | 1.2 R + T | Color non-uniformity rank | Aging |
|---|---|---|---|---|---|
| 1 | 5 | 100 | 106 | 2 | Not required |
| 2 | 5 | 125 | 131 | 3.5 | " |
| 3 | 10 | 100 | 112 | 2 | " |
| 4 | 10 | 110 | 122 | 3 | " |
| 5 | 10 | 125 | 137 | 4 | " |
| 6 | 20 | 100 | 124 | 3 | " |
| 7 | 27.5 | 100 | 133 | 4 | " |

COMPARATIVE EXAMPLES 1–4

In Comparative Examples 1 and 2, a polyvinyl butyral resin sheet having a colored layer was formed by extrusion molding and then embossed in the same way as in Examples 1–7 except that R and T in expression (1) were changed as shown in Table 2.

In Comparative Examples 3 and 4, the cold press rolls 15 and the guide rolls 16 and 17 in FIG. 1 were not used, and the extruded thermoplastic resin sheet was immediately conducted to the emboss rolls 18 and embossed. The distance between the sheet forming die 7 and the emboss rolls 18 was adjusted to three times that between the die 7 and the cold roll 15 in the above Examples. The results are shown in Table 2.

It is seen from Table 2 that the resins obtained in Comparative Examples 1 to 4 had a color non-uniformity rank of at least 5; and as shown in the right end of Table 2, required aging for a long period of time (aging temperature 40° C.).

TABLE 2

| Comparative Example | R (μm) | T (°C.) | 1.2 R + T | Color non-uniformity rank | Aging period (40° C.) |
|---|---|---|---|---|---|
| 1 | 20 | 125 | 149 | 5 | 20 days |
| 2 | 5 | 150 | 156 | 6.5 | 25 days |
| 3 | 10 | 150 | 160 | 7 | 30 days |
| 4 | 20 | 150 | 174 | 8 | 60 days |

According to this invention, an embossed thermoplastic resin sheet having little or no color non-uniformity can be produced with good productivity by forming a two-layered thermoplasstic resin sheet having a colored layer by extrusion molding and successively embossing it under the conditions satisfying the expression (1). The aging step required in the prior art can therefore be omitted in this invention. Accordingly, the process is simplified, and the time and the cost of energy can be saved.

What is claimed is:

1. A process for continuously producing an embossed thermoplastic resin sheet having a colored layer which comprises associating a molten thermoplastic resin A and a molten thermoplastic resin B having a different color from the resin A within a die for extrusion molding, extruding the associated mass through an extrusion opening to form a two-layered thermoplastic resin sheet, and thereafter embossing the sheet, wherein the temperature T (°C.) of the thermoplastic resin sheet immediately before the embossing and the surface roughness R (micrometers) of said sheet immediately before the embossing expressed by a 10-point average roughness in accordance with ISO-R468 are selected so as to satisfy the following relation $1.2R + T \leq 145$ (1).

2. The process of claim 1 wherein the surface roughness R of the thermoplastic resin sheet immediately before the embossing is in the range of 3 to 30 micrometers.

3. The process of claim 1 wherein the temperature T of the thermoplastic resin sheet immediately before the embossing is in the range of 90° to 150° C.

4. The process of claim 3 wherein the temperature T of the thermoplastic resin sheet immediately before the embossing is in the range of 100° to 140° C.

5. The process of claim 1 wherein the thermoplastic resins A and B are a plasticized polyvinyl acetal.

* * * * *